United States Patent [19]
Mounsey

[11] Patent Number: 5,919,842
[45] Date of Patent: Jul. 6, 1999

[54] WATER-BASED LATEX PHENOLIC COATING COMPOSITION

[76] Inventor: Gerald W. Mounsey, 290 N. Water St., Ney, Ohio 43549

[21] Appl. No.: 09/078,320

[22] Filed: May 14, 1998

Related U.S. Application Data

[60] Provisional application No. 60/046,631, May 16, 1997.
[51] Int. Cl.$^6$ .......................... C08L 63/00; C08L 61/04; C08L 33/06; C08L 31/04
[52] U.S. Cl. .......................... 523/412; 523/424; 523/443; 523/444; 523/448
[58] Field of Search .................... 523/412, 424, 523/443, 444, 448

[56] References Cited

U.S. PATENT DOCUMENTS

| | | | |
|---|---|---|---|
| 1,900,660 | 3/1933 | Pawlitschko | 162/180 |
| 1,974,477 | 9/1934 | Walters | 428/533 |
| 2,509,499 | 5/1950 | Higgins | 428/506 |
| 2,703,051 | 3/1955 | Richardson | 101/401.1 |
| 2,831,224 | 4/1958 | Libberton | 164/2 |
| 3,377,950 | 4/1968 | Squitieri et al. | 101/401.2 |
| 3,470,059 | 9/1969 | Jonnes | 428/313.9 |
| 3,627,255 | 12/1971 | Daniels | 249/24 |
| 3,668,058 | 6/1972 | Pappadakis | 428/215 |
| 4,137,363 | 1/1979 | Maron et al. | 428/338 |
| 4,515,739 | 5/1985 | Maine | 264/453 |

*Primary Examiner*—Peter A. Szekely
*Attorney, Agent, or Firm*—Shlesinger Arkwright & Garvey LLP

[57] ABSTRACT

A matrix board coating composition for use in the formation of a mold in which flexographic printing plates are produced, the coating is a water-based, latex emulsion having a two step phenolic component to increase shelf life, reduce volatiles and improved flow properties of the coating.

2 Claims, No Drawings

WATER-BASED LATEX PHENOLIC COATING COMPOSITION

CROSS-REFERENCE TO RELATED APPLICATION

This application is a continuation of Provisional Application No. 60/046,631, filed May 16, 1997.

FIELD OF THE INVENTION

The present invention relates to matrix boards coatings for use in the formation of a mold in which flexographic printing plates are produced or the formation of embossed counter tops, rubber stamps or the like.

BACKGROUND OF THE INVENTION

In the manufacture of matrix boards for use in forming flexographic printing plates, impressions are formed in the matrix boards using a master. The impression is usually achieved by pressing the matrix material against the master plate under high pressure and heat. The high temperature and pressure applied against matrix boards coated with prior art coatings causes distortion of the rubber or photopolymer coating whereby unsatisfactory matrices are obtained and/or the masters are damaged. This is because prior art coatings are organic solvent-based compositions and therefore they have a tendency to lock-in moisture which blisters during pre-heating.

In addition, applying the prior art coatings to the board within a desired thickness is difficult and time consuming. For example, a typical single pass coating using prior art compositions is limited in thickness to 0.020". As is apparent, several passes are then required if a thickness of 0.200" is desired.

Finally, prior art coating compositions for matrix boards employ so-called "one step" phenolic resins. One step phenolic resins are formed as a reaction product of formaldehyde and phenol in the presence of a catalyst. The reaction is terminated prior to complete crosslinking to permit final crosslinking during molding of the finished product. Coatings based upon such one step phenolic resins have been found to have a relatively short shelf life.

OBJECTS AND SUMMARY OF THE INVENTION

The above problems concerning creation of the impression for the mold in the matrix board are solved by the present invention which is directed to a new, water-based, latex emulsion, phenolic coated matrix board for use in the flexographic printing industry and embossing industry. The coating of the present invention is a multiple thermoset coating that is distributed on the phenolic composite board by means of an airless assisted air coating system and/or curtain coater. In this manner, applicant of the present invention has discovered that a two-step phenolic resin can be used in the present coating rather than the prior art use of a one-step phenolic resin having a significantly shorter shelf life than the present invention.

The coating according to the present invention is latex-based thereby offering the advantage of being an environmentally safer and a less-hazardous material for use by the consumer. The water-based latex formulation emits less volatile organic compounds (VOC's) than the prior art solvent-based formulas and therefore is safer and less environmentally hazardous.

The resin according to the present invention flows much more easily than a conventional solvent-based coatings which in turn provides a more accurate penetration of the original master and thereby eliminates distortion of characters in the image during application of heat and pressure. The result is a sharper image and thicker coatings following a single pass. Coating thicknesses using the present invention achieve a thickness up to 0.080".

The present invention also provides better "lay-flat" than conventional solvent-based coated boards due to the nature of the coating. The present coating has less shrinkage and quicker stability than the prior art solvent-based coatings, further resulting in a more accurate mold.

Prior art solvent-based matrix boards "lock-in" moisture when subjected to heat and pressure. The solvent within prior art coatings is not compatible with water. Consequently, moisture during cure becomes locked-in between the coating and the board resulting in blisters. Matrix boards containing prior art solvent-based coatings must therefore be used in areas having extremely dry environmental conditions i.e. low humidity. Conversely, the latex-boards according to the present invention breath and expire moisture from the coating during the preheat cycle allowing the moisture to escape. This eliminates blisters associated with the prior art solvent-based coatings.

The present invention is compatible with various types of original plates including copper, zinc, magnesium, MLD, rigilon and liquid masters. The present invention eliminates the need for the use of silicone or other solvent-based release agents. This provides the added advantage since such VOC-based release agents cause problems related to ink transfer when used on a printing press. The present invention can be used in conjunction with dry film release agents that contain no C.F.C.'s and therefore do not affect ink pick-up or transfer.

Consecutive rubber plates built and described according to the present invention can be pulled with less tension thereby eliminating hot tears which have been a problem with solvent-based compositions. Also, surface tension of the molds surface allows rubber to flow slower and more consistently. This eliminates non-fills of rubber in image.

The present invention is also directed to a matrix coating system and method of manufacture for molding printed plates comprising providing a water-based latex emulsion coating composition that is thermosetting and moldable and comprises water, glass beads, a two-step phenol-containing resin, hydroxyethyl cellulose, PVAC glue, a filler material, an epoxy, a wetting agent and a dye to form a slurry, applying the slurry to a substrate to form a wet coating which is agitated during application, drying the agitated wet coating whereby a water-based matrix coating that is moldable and curable under heating conditions is formed on the substrate.

DETAILED DESCRIPTION OF THE PREFERRED EMBODIMENT

The water-based latex phenolic coating according to the present invention comprises the following ingredients that are agitated prior to coating onto a substrate:

| | |
|---|---|
| 15–35% by wt. | H$_2$O |
| 20–28% | Glass Beads |
| 15–30% | Phenol-Containing Resin |
| 12–20% | Hydroxyethyl cellulose solution(10:1) |
| 5–9% | PVAC-based; adhesive |
| 1.5–3% | Feldspar Mineral |
| 1.5–3% | Wollastonite (Calcium Metasilicate) |
| 1.2–2.2% | Diatomaceous Earth (Amorphous S$_1$O$_2$) |
| 1–2% | Epoxy Resin (Bisphenol A-Type) |
| 0.5–1% | Polyalkyleneoxide wetting agent |
| 2.5–4.5% | Acrylic latex |
| <2% | Dye (Pergasol) |

The glass beads are preferably 325 mesh size but others sizes are within the scope of the invention depending upon the particular application. The PVAC-based adhesive is available through Colland, Inc. of Switzerland and sold under the name Aqualine. The hydroxyethyl cellulose is a cellulose ether and available through Union Carbide of Danbury, Conn. and sold under the name Cellosize. The wetting agent is a polyalkyleneoxide modified polydimethylsiloxane available through OSi Specialties, Inc. of Greenwich, Conn. and sold under the name Silwet L-7210. The diatomaceous earth is amorphous silica dioxide and available through CR Mineral Corporation of Golden, Colo. and sold under the name DiaFil 10. The Wollastonite otherwise known as calcium metasilicate is available through NYCO Minerals, Inc. in a variety of powder grade and aspect ratio's. The phenol-containing resin may be a phenol-based resin containing fillers such as carbon black, graphite, mica, talc or the like. A preferred phenol resin according the present invention is sold under the name Plenco 06802 and 06343 and available from Plenco Plastics. The dye may be any such dye available in the art for coatings of the present type. For example, a copper complex based dye is available through Ciba-Geigy Corporation of Greensboro, N.C. and sold under the name Pergasol. The acrylic latex component is a ethyl acrylate type resin manufactured by Union Carbide and sold under the name Ucar 102. The bisphenol A type epoxy resin is a modified liquid epoxy resin sold under the name Araldite PY 322 and manufactured by Ciba-Geigy Corporation. The feldspar mineral component or nepheline syenite is readily available from a variety of vendors; for example, Unimin Canada Ltd. of Ontario, Canada. As is apparent, other brands of the above components are within the scope of the present invention.

The coating of the present invention is preferably intermixed as follows. The PVAC adhesive is blended for about fifteen minutes with the water. The phenol containing resin component is then added and blended for about thirty minutes followed by the addition of the glass beads, feldspar and wollastonite, each of which is separately added and blended individually for about thirty minutes. The acrylic latex component and the diatomateous earth are also separately blended for one hour each. The hydroxyethyl cellulose solution is prepared as a stock mixture and blended in a 1:5 ratio of cellulose to water. The solution must be prepared by blending the cellulose and water for at least two hours to ensure intimate emulsification as to allow the air the escape. It is then allowed to stand at least twenty-four hours prior to addition to the formulation at which time it is blended for an additional hour. The epoxy resin may then be added and blended for one hour followed by the addition of the polyalkyleneoxide for an additional two hours of blending. The dye is blended for two hours.

The pH level is maintained at about 5.0. Temperature during mixing should not exceed 90 degrees F during either mixing or application. Optimum coating spray temperature is 85–95 F.

Once the above formulation has been intermixed at room temperature, a conventional matrix board or other suitable substrate that is preferably a phenolic based is provided and the above latex-based coating is formed thereon. The coating is applied to a conventional matrix board using apparatus which agitate and maintains the formulation in a slurry during coating. The coated matrix board is subsequently dried to remove the water from the coating. In the present invention, the evolution of water during drying is virtually complete. Drying cycle requires an initial air dry of about 10 hours at ambient temperatures in a moisture controlled room followed by a force dry for one and one half hours at about 170 degrees F.

Following coating and drying the board may be shipped to the manufacturer for subsequent use.

Applicant has found that following coating, leftover coating can be reclaimed into a virgin mixture if added up to about 15% by weight of the virgin mixture.

The coating may be applied by means of an airless assisted spray system utilizing a tip orifice of 0.018" to about 0.026" or greater. The formulation should be maintained in a mixing vessel under vacuum to alleviate air entrainment problems during spraying. Applicant has achieved single pass coating thicknesses at least 0.080" and as high as 0.140".

EXAMPLE 1

Following is a nonlimiting example illustrating a coating prepared in accordance with the requirements of the present invention.

| Ingredients | % by Weight |
|---|---|
| Water | 26.6 |
| PVAC adhesive (Aqualine; Coiland, Inc.) | 6.9 |
| Phenol resin (Plenco P06802; Plenco Pastics) | 18.4 |
| Glass Microspheres (Potter's Inc.) | 22.0 |
| Nepheline Syenite (Minex 10; Unimen, Ltd.) | 2.0 |
| Wollastonite (10 Wollastocoat; Nyco, Inc.) | 2.0 |
| Acrylate latex (UCAR 102; Union Carbide) | 3.0 |
| Diatomaceous earth (DiaFil 10; CR Minerals) | 1.5 |
| Epoxy resin (Araldite PY 322; Ciba-Geigy) | 1.3 |
| Hydroxyethylcellulose Solution (10:1) (Union Carbide) | 15.5 |
| Wetting Agent (Silwet L7210; Wilko Corp.) | 0.7 |
| Dye (Pergasol Blue 2R; Ciba-Geigy) | .4 |

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

I claim:

1. A matrix board coating composition comprising by weight of the total composition the following ingredients:

| | | |
|---|---|---|
| a) | about 15 to about 35% | H$_2$O |
| b) | about 20 to about 28% | Glass beads |
| c) | about 15 to about 30% | Phenol-Containing Resin |
| d) | about 12 to about 20% | Hydroxyethyl cellulose solution(10:1) |
| e) | about 5 to about 9% | PVAC-based adhesive |
| f) | about 1.5 to about 3% | Feldspar Mineral |
| g) | about 1.5 to about 3% | Wallastonite |
| h) | about 1.2 to about 2.2% | Diatomaceous Earth |
| i) | about 1 to about 2% | Epoxy Resin; and |
| j) | about 2.5 to about 4.5% | Acrylic latex. |

2. A water based matrix board coating composition including by weight of the total composition:

| | |
|---|---|
| a) | about 15-30% phenol containing two-step resin; |
| b) | about 12-20% hydroxyethyl cellulose solution (10:1); |
| c) | about 5-9% PVAC-based adhesive; |
| d) | about 1.5-3% Wollastonite; |
| e) | about 1-2% epoxy resin; |
| f) | about 2.5-4.5% acrylic resin; and |
| g) | balance water, glass beads, feldspar minerals and diatomaceous earth. |

* * * * *